United States Patent [19]

Young

[11] 4,179,234

[45] Dec. 18, 1979

[54] BLENDING FLOWABLE SOLID MATERIALS

[75] Inventor: William Young, Swanley, England

[73] Assignee: Davy International (Oil & Chemicals) Limited, London, England

[21] Appl. No.: 886,562

[22] Filed: Mar. 14, 1978

[30] Foreign Application Priority Data

Mar. 15, 1977 [GB] United Kingdom ............... 10922/77

[51] Int. Cl.[2] ............................................ B65G 65/32

[52] U.S. Cl. .................................. 414/268; 198/547; 198/580; 414/133; 414/786

[58] Field of Search ............... 414/133, 786, 268, 269, 414/285; 198/540, 547, 560, 569, 580, 585

[56] References Cited

U.S. PATENT DOCUMENTS 3,506,146 4/1970 Parigot ................................ 214/152

FOREIGN PATENT DOCUMENTS 1234105 6/1971 United Kingdom ..................... 414/133

*Primary Examiner*—Trygve M. Blix

*Assistant Examiner*—George F. Abraham

*Attorney, Agent, or Firm*—Bernard & Brown

[57] ABSTRACT

An apparatus and method are disclosed for blending flowable solid materials. These are conveyed in turn, conveniently over a belt weigher, to a tripper mounted above a hopper so as to build up a first charge consisting of a plurality of inclined contiguous bands each of a different material. A paddle feeder removes material in a series of passes along the bottom of the first charge, the material removed being conveyed again to the tripper for discharge into a second hopper adjacent the first, thereby to build up a second charge also consisting of a plurality of inclined contiguous bands each of a different material. A second paddle feeder then removes material in a series of passes along the second charge to form the final blend.

23 Claims, 4 Drawing Figures

BLENDING FLOWABLE SOLID MATERIALS

This invention relates to a method of and apparatus suitable for blending flowable solid materials.

Flowable solid materials require to be blended on a large scale in a number of industries, for example the metallurgical, fertilizer and cement industries.

In the metallurgical industry, for example, a metallurgical furnace such as a copper smelter is usually designed to operate on a feed charge having metal contents and impurity levels lying within specified ranges. However actual batches of ore may vary quite widely in metal content and/or impurity level and often it is found that these values for a particular batch lie outside the specified design ranges. Thus it is common practice to blend ore from different batches, which, although nominally of the same composition, may differ in metal content and/or in impurity level because, for example, they originate from different locations. In this way differences between different batches of metal content or of impurity level may be balanced so as to make up a feed charge batch of the appropriate composition. Any necessary additives such as fluxes can be blended in during the making up of the feed charge batch or can be added separately to the copper smelter or other furnace.

In blast furnace operations it is a common practice to pre-mix the iron ore, coke, limestone and any other desired additives, e.g. slag-forming additives, prior to charging to the blast furnace at a rate of perhaps several thousand tons per hour. However such blending is usually on a much larger scale, involving preparation of a feed charge batch of many thousands of tons, compared with copper smelter operations where feed rates of the order of 40 tons per hour are not uncommon, corresponding to a feed batch size requirement of 320 tons for a 8-hour working shift.

In large scale operations, such as blast furnace operations, blending can be carried out by feeding the solid materials to be blended continuously in turn to a blending area. Using a stacker comprising a belt conveyor and a belt tripper or other suitable feeder device an elongate pile is built up in which the various batches of materials to be blended from discrete layers. When the pile is complete an automated reclaiming machine arranged to feed a belt feed conveyor leading to the furnace area is traversed slowly along the pile. In this way the materials fed to the belt feed conveyor are blended automatically. The scale of the equipment has of course to be massive and, since it is usual to build a pile for the next feed batch whilst reclaiming a previously built pile, duplication of at least most of the equipment is necessary.

Proposals have previously been made for blending smaller batches of material involving a few hundred tons for smaller scale operations such as, for example, in copper smelter operations. One proposal involves transferring the materials to be blended from their respective stockpiles to individual feed bins or hoppers by front end loaders. Each feed bin or hopper, of which there may be, for example 6 or 8, has an adjustable throat arranged to discharge on to a respective belt weigher. All of the belt weighers discharge continuously into a main feed charge batch hopper. High and low level warning devices are fitted to each feed bin or hopper and the drivers of the front end loaders have to ensure that the individual feed bins or hoppers are kept supplied with the individual components of the blend throughout the blending operation.

A disadvantage of this arrangement is that the use of a plurality of belt weighers is involved. Also, it will usually be necessary to have more than one front end loader and driver available throughout the blending operation to ensure that all feed bins are kept filled. Although belt weighers can be calibrated with an accuracy of perhaps ½% at full load, frequent maintenance and calibration is necessary if this accuracy is to be maintained. Furthermore the make-up of a particular feed blend batch may require that one or more of the belt weighers operates at low load with a consequent reduction of accuracy and with an increased danger of "bridges" forming in the corresponding feed bin or hopper and of consequent interruption of the flow of that particular material to the blend batch hopper. The operation of such a blending installation requires careful monitoring by the operating personnel, therefore, if satisfactory operating is to be achieved.

According to the present invention there is provided a method of blending flowable solid materials which comprises establishing an elongate first charge of the materials to be blended of substantially uniform height comprising a plurality of contiguous transverse first bands, each extending from top to bottom of the first charge and each being composed of a different flowable solid material from that of the or each adjacent first band; removing material from each first band in turn in a plurality of first passes made lengthwise of the first charge, the quantity of material removed from the first charge in each first pass being small in comparison with the initial volume of the first charge; establishing an elongate second charge of substantially uniform height comprising a plurality of contiguous transverse second bands, each extending from top to bottom of the second charge and each being substantially composed of material removed from a corresponding first band; and removing material from each second band in turn in a plurality of second passes made lengthwise of the second charge, the quantity of material removed from the second charge in each second pass being small in comparison with the initial volume of the second charge.

Preferably the step of establishing the elongate first charge comprises supplying the materials to be blended continuously in turn to a first storage location provided with an upwardly extending first end surface at one end thereof, and building up the first charge to the desired height against the first end surface. According to one procedure the step of building up the first charge comprises feeding the materials to be blended continuously in turn to a delivery point above the first storage location, sensing the height of material deposited at the first storage location in the region of the delivery point, and moving the delivery point longitudinally of the first storage location away from the one end thereof in dependence on the sensed height.

In a similar manner the step of establishing the elongate second charge preferably comprises supplying the material removed from the first charge continuously to a delivery point above a second storage location provided with an upwardly extending second end surface at one end thereof, and building up the second charge to the desired height against the second end surface.

Conveniently the step of establishing the second charge comprises feeding the material removed from the first charge continuously to a delivery point above the second location, sensing the height of material deposited at the second storage location in the region of the delivery point, and moving the delivery point longitudinally of the second storage location away from the one end thereof in dependence on the sensed height.

In the method of the invention it is preferred to remove material from the first and/or second charge from the bottom of the respective charge in each of a plurality of first and/or second passes, as the case may be.

The invention further provides apparatus for blending flowable solid materials comprising means defining a first storage location; feed means for feeding the flowable solid materials continuously in turn to the first storage location so as to establish at the first storage location an elongate first charge of the materials to be blended of substantially uniform height comprising a plurality of contiguous transverse first bands, each extending from top to bottom of the first charge and each being composed of a different flowable solid material from that of the or each adjacent first band; first extractor means longitudinally traversable with respect to the first storage location for removing material from the first charge; means for traversing the first extractor means longitudinally of the first charge in a plurality of first passes and arranged to remove material from each first band in turn in each first pass, the quantity of material removed from the first charge in each first pass being small in comparison to the initial volume of the first charge; means defining a second storage location; conveying means for conveying to the second storage location material removed from the first charge and arranged so as to establish at the second storage location an elongate second charge of substantially uniform height comprising a plurality of contiguous transverse second bands, each extending from top to bottom of the second charge and each being composed substantially of material removed from a corresponding first band; second extractor means traversable with respect to the second storage location for removing material from the second charge; and means for traversing the second extractor means longitudinally of the second charge in a plurality of second passes and arranged so as to remove material from each second band in turn during each second pass, the quantity of material removed from the second charge on each second pass being small in comparison to the initial volume of the second charge.

Conveniently the first and second storage locations comprise respective first and second hoppers, which are preferably disposed adjacent one to another. Each hopper may be of the slot discharge type having an elongate opening at its lower end arranged a predetermined height above a support surface whereby, in use, at least some of the material charged to the hopper emerges from the opening to form an elongate pile on the support surface below the opening of the hopper. In this case at least one of the first and second extractor means comprises a paddle feeder.

In a preferred form of apparatus the first storage location is provided at one end thereof with an upwardly extending first end surface, and the feed means comprises means for continuously feeding the materials to be blended in turn to a delivery point above the first storage location, first sensor means for sensing the height of material deposited at the first storage location in the region of the delivery point, and means for moving the delivery point along the first storage location away from the first end surface in dependence on the height sensed by the first sensor means. The feed means may comprise an endless belt feed conveyor incorporating a tripper.

It is preferred that the feed means comprises an endless belt feed conveyor, a reception hopper for the flowable solid materials to be blended for supplying the endless belt feed conveyor, and a belt weigher for weighing materials carried by the endless belt feed conveyor.

The second storage location may be provided at one end with an upwardly extending second end surface, in which case the conveying means conveniently comprises means for continuously feeding material removed from the first charge to a delivery point above the second storage location, second sensor means for sensing the height of material deposited at the second storage location in the region of the delivery point, and means for moving the delivery point along the second storage location away from the second end surface in dependence on the height sensed by the second sensor means.

Desirable economies of equipment can be achieved if the material removed from the first charge is conveyed to the second storage location along a pathway which coincides partly with the pathway followed by the materials to be blended in their passage to the first storage location. Thus it is preferred that the feed means comprises an endless belt feed conveyor incorporating a tripper and selective discharge means for selectively discharging material from the tripper to a chosen one of the first and second storage locations, the conveying means including an endless belt transfer conveyor arranged to transfer material extracted from the first charge to the endless belt feed conveyor upstream from the tripper. In a convenient arrangement the tripper comprises a chute device having first and second exit openings communicating with the first and second storage locations respectively, the selective discharge means comprising a flopper for diverting material discharged from the feed conveyor to a chosen one of the two exit openings.

In order that the invention may be clearly understood and readily carried into effect a preferred method in accordance therewith, and a form of apparatus suitable for performing such a method, will now be described, by way of example only, with reference to the accompanying diagrammatic drawings, wherein.

Figure 1:
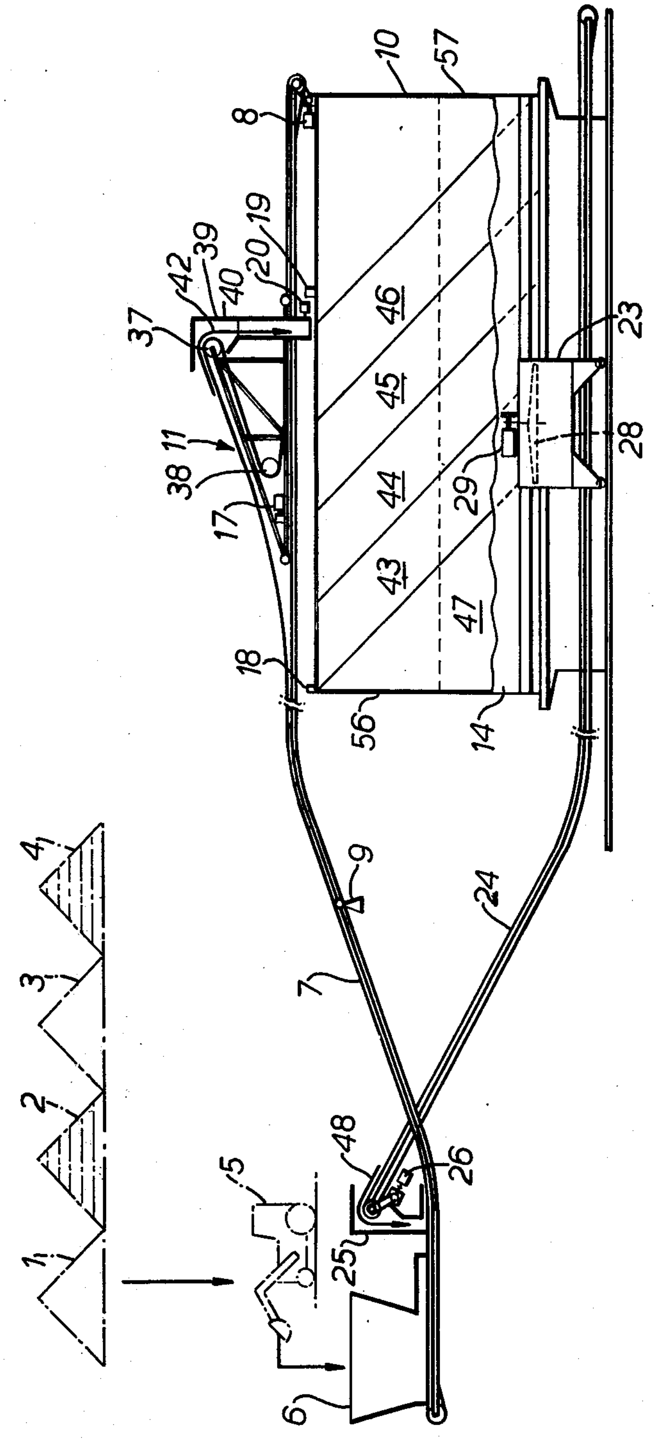
FIG. 1 is a side view, partially in section of a blending installation in accordance with the invention showing a first charge in one of the hoppers.

Referring to the drawings, and in particular to FIG. 1, the flowable solid materials to be blended are each drawn from a respective stockpile 1, 2, 3 or 4 by means of a front end loader 5 for conveyal to a reception hopper 6. Each of the materials in the stockpiles 1, 2, 3 and 4 has preferably been subjected to a suitable grinding or other comminuting operation and/or graded so that each material has substantially the same angle of repose as the others. In other words on forming a sample of each material into a pile, the angle of slope of each pile will be approximately equal to the corresponding angle for the piles of all the other materials. The degree of comminution of the materials is not critical so long as they are all readily flowable and all have substantially the same angle of repose. Preferably the materials are all −16 mesh (British Standard Sieve) and they will usually be comminuted to at least −100 mesh. Typically all of the materials are −200 mesh, for example.

FIG. 1 shows four stockpiles 1 to 4; the invention is however not limited to the blending of any particular number of materials. In some cases more than four materials may be required to be blended, e.g. 5, 6, 8 or 10 or more, and in other cases it may be desired to blend only 2 or 3 materials.

Figure 2:
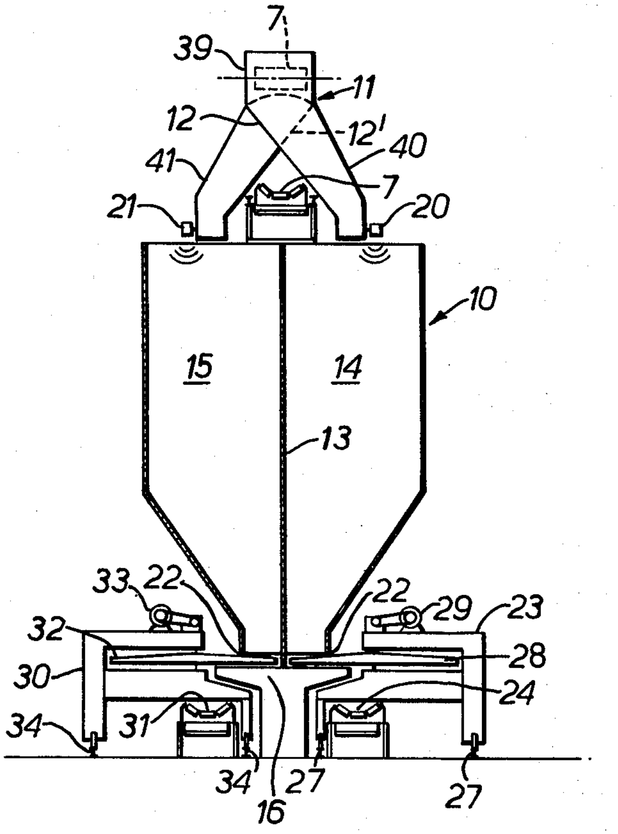
FIG. 2 is a vertical section through the hopper assembly of the installation of FIG. 1.

Reception hopper 6 is arranged to discharge onto a feed conveyor 7 driven by a suitable motor 8 and fitted with a belt weigher 9. Feed conveyor 7 is provided with a conventional belt tensioning arrangement (not shown) and is arranged to discharge into an elongate hopper assembly 10 via a tripper 11 fitted with a flopper 12 (which is shown in FIG. 2 but, for the sake of simplicity is omitted from the other Figures). Hopper assembly 10 is divided longitudinally by a vertical wall 13 into first and second hoppers 14 and 15. Material from feed conveyor 7 can be diverted into a chosen one of the two hoppers 14 and 15 depending on the position of the flopper 12. In the full line position of the flopper 12 shown in FIG. 2, material will be diverted into first hopper 14, whereas in the position 12′ shown in broken lines the flopper 12 will divert material from feed conveyor 7 into second hopper 15. Each of the hoppers 14 and 15 is of the slot discharge type, and is open at its lower end, being arranged to discharge onto a horizontal shelf 16. Vertical wall 13 extends down to shelf 16. Materials flowing out of hoppers 14 and 15 can form respective piles on shelf 16.

Figure 3:
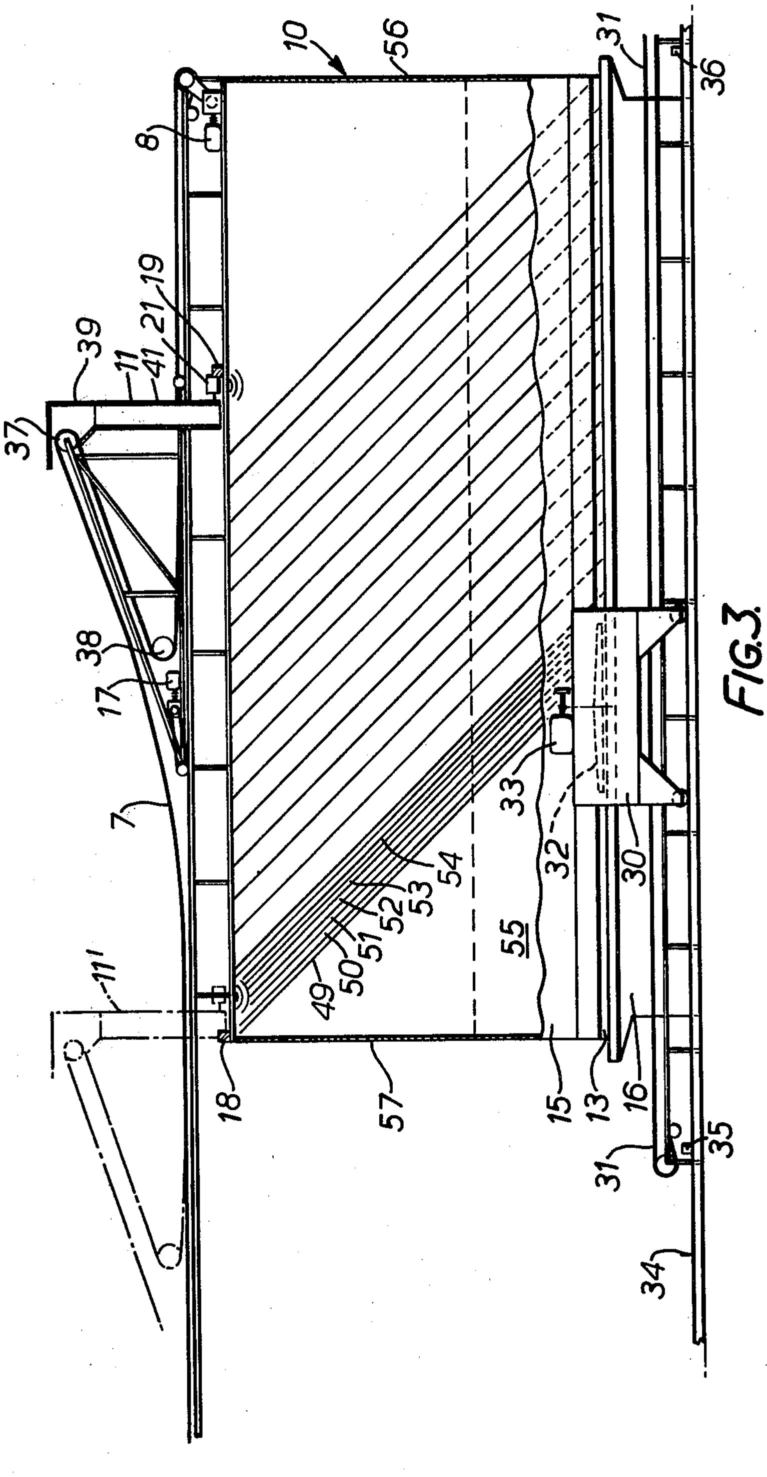
FIG. 3 is a similar view to that of FIG. 1 to an enlarged scale showing a second charge in the other hopper.

Tripper 11 is arranged in conventional fashion so as to run on rails (not shown in the drawings for the sake of clarity) which extend along the top of the hopper assembly and some distance to the left of it, as shown in FIG. 3, so as to permit it to move from the position shown in full lines to the position 11′ shown in broken lines. Adjustable limit switches 18 and 19 indicated in FIGS. 1 and 3 are used to limit the movement of tripper 11 along its rails. Movement of tripper 11 along its rails is controlled by a pair of sensors 20 and 21 as will be described hereafter.

The height of the lower end 22 of the outer side wall of each of hoppers 14 and 15 above the shelf 16 can be adjusted in a conventional manner. In this way it can be ensured that, within a certain predetermined range of particle size, and hence of the corresponding angle of repose, a pile of material from the corresponding hopper can be formed on the shelf 16 on each side of vertical wall 13 without overflowing over the lateral edge of the shelf 16. By suitable adjustment of the lower ends 22, the apparatus can be adapted for use with a wide variety of flowable solid materials of differing average particle size.

A paddle feeder 23 is traversable longitudinally of the hopper assembly 10 and is arranged to feed a return conveyor 24 with material from hopper 14 that has fallen onto shelf 16. Return conveyor 24 discharges into a hopper 25 from which material can be returned to hopper assembly 10 by feed conveyor 7. Reference numeral 26 indicates a motor for return conveyor 24 and reference numerals 27 show the rails on which paddle feeder 23 is arranged to run.

The paddle of paddle feeder 23 is shown at 28 and is driven by a motor 29. The arrangement for driving paddle feeder 23 along its rails 27 is conventional. Movement of the paddle feeder 23 is controlled in a conventional manner by appropriate limit switches (not shown in FIG. 1 for the sake of simplicity).

A second paddle feeder 30 is traversable longitudinally of hopper assembly 10 for feeding material falling from second hopper 15 onto shelf 16 to a further endless belt conveyor 31 which serves to convey the blended materials away to a storage area, to a furnace or to some other desired location. As with feed conveyor 7, conveyor 31 and return conveyor 24 are provided with a conventional belt tensioning arrangement (not shown). As before, the paddle 32 of paddle feeder 30 is driven by a motor 33 and rails 34 are provided on which paddle feeder 30 is arranged to run. As with paddle feeder 23 the arrangement for driving paddle feeder 30 along rails 34 is conventional. Adjustable limit switches 35 and 36 are used to control movement of paddle feeder 30 along its rails 34. (The limit switches for controlling movement of paddle feeder 23 are similar).

As shown in FIGS. 1 and 3, the load conveying run of feed conveyor 7 passes around reversing rollers 37 and 38 mounted on a tripper 11. Material from reception hopper 6 is conveyed on feed conveyor 7 as far as reversing roller 37 whereupon it is discharged into the throat 39 of tripper 11 as shown by arrow 42 in FIG. 1 to fall down one or other of chutes 40 and 41 depending on the position of flopper 12.

In use, in order to blend a number of flowable solid materials by the method of the invention the make-up of the blend to be made is first decided and then the flopper 12 is put in the full line position of FIG. 2 and the materials to be blended are fed batchwise in turn via reception hopper 6 to feed conveyor 7. The front end loader driver or drivers continue to feed a particular material from one of the stockpiles 1, 2, 3, 4 etc. to the hopper 6 until belt weigher 9 indicates that the desired quantity has been delivered. Thereupon the driver or drivers switch to another of the stockpiles and feed another material, repeating the procedure for each component of the blend. Since all of the components are weighed by the same belt weigher 9 they will be delivered in the correct proportions despite any calibration error of belt weigher 9. No supervision of the reception hopper 6 or feed conveyor 7 by operating personnel is required.

Figure 4:
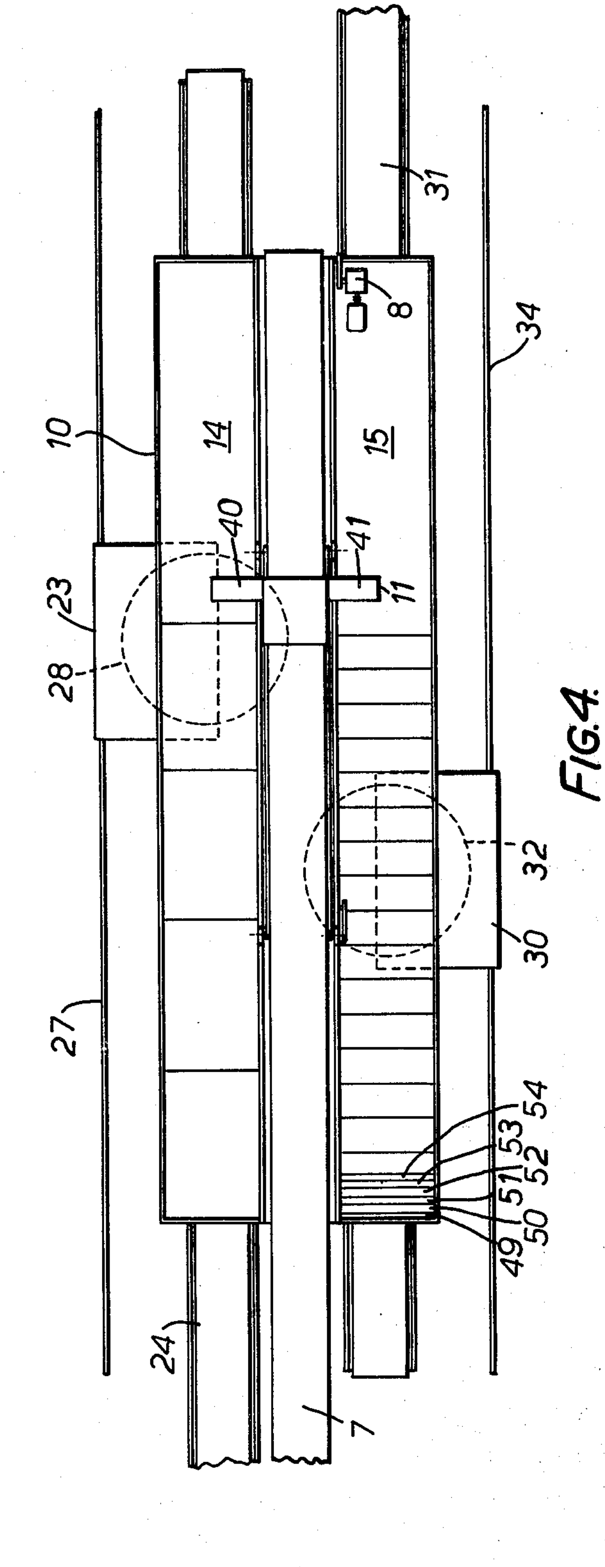
FIG. 4 is a plan view of the hopper assembly of FIGS. 1 to 3.

At the start of a blending operation tripper 11 is withdrawn to one end of the hopper (i.e. the left-hand end as shown in FIGS. 1, 3 and 4). This position is indicated in broken lines at 11′ in FIG. 3. (It will be appreciated that in FIG. 1 feed conveyor 7 is not drawn precisely to scale; in particular a longer horizontal run immediately to the left of hopper assembly 10 would be needed in practice in order to allow tripper 11 to move far enough to the left). Material falling from feed conveyor 7 at reversing roller 37 will fall into throat 39 and down chute 40 into hopper 14 to form a heap therein whose right-hand slope will have the characteristic angle of repose of the particular material. When sensor 20 senses that the heap formed in hopper 14 below chute 40 has reached a predetermined level, motor 17 is automatically actuated and tripper 11 is shifted a predetermined short distance along the hopper assembly 10 (to the right as illustrated in FIGS. 1, 3 and 4). In this way an elongate charge of substantially constant height is gradually built up in hopper 14 consisting of a plurality of first bands 43, 44, 45, 46, each consisting of a different material. For example, when copper ores are being blended, each first band 43, 44, 45, 46 may comprise ore mined at a different location, each nominally perhaps of the same mineral, but differing from the others in its copper content and/or impurity levels. Reference numeral 47 indicates a region of "dead material" which is allowed to build up in the hopper 14 on its first filling and is thereafter not disturbed.

When the elongate charge has been built up, paddle feeder 23 is traversed in a first pass along the hopper 14 so as to dislodge material from shelf 16 onto return conveyor 24. In this way paddle feeder 23 removes material in turn from first bands 43, 44, 45 and 46. Its controlling limit switches are set so that it does not remove any of the "dead material" 47. At the end of each pass of paddle feeder 23 along the charge in hopper 14 its direction of movement is reversed for a fresh pass. In this way the material of the charge is gradually removed in a plurality of passes of the paddle feeder 23. The speed of traversing of paddle feeder 23 along hopper 14 is set so that the quantity of material removed in any one pass of paddle feeder 23 is small in comparison to the initial volume of the charge formed by the first bands 43, 44, 45 and 46 in the hopper 14.

Before initiating the traversing movement of the paddle feeder 23 the tripper 11 is returned to its start position 11' and flopper 12 is moved to the position 12' of FIG. 2. The material removed from hopper 14 is thereby fed via conveyor 24 and then as shown by arrow 48 into intermediate hopper 25. From intermediate hopper 25 the material returns via feed conveyor 7 to tripper 11 and down chute 41 into hopper 15. The second height sensor 21 senses the height of the pile of material in hopper 15 below chute 41 and is used to control movement of tripper 11 along hopper assembly 10 in a manner analogous to that by which sensor 20 controls the movement of tripper 11 along hopper 14. In this way an elongate charge of substantially constant height is built up in hopper 15. This charge consists of a large number of thin second bands 49, 50, 51, 52, 53, 54 etc., each extending from top to bottom of the charge and each consisting of material removed by paddle feeder 23 in one of its passes from a corresponding one of the first bands 43, 44, 45, 46. Calling the materials of first bands 43, 44, 45 and 46 by the reference letters A, B, C and D respectively then second bands 49, 50, 51, 52 consist of portions of materials A, B, C and D respectively removed in the first pass of paddle feeder 23 whilst second bands 53, 54 etc. are comprised of material C, B, etc. removed in the second and subsequent passes of paddle feeder 23. In this way the second charge in hopper 15 consists of a plurality of second bands of material each stretching from top to bottom of the charge in the order ABCDCBABCDC . . . etc. In FIG. 3 all the bands of the second charge will have a thickness similar to that of second bands 49, 50, 51 etc., but for the sake of clarity only a few such thin bands are shown. The precise thickness of second bands 49, 50, 51 etc. will depend on the number of bands in the first charge, their thickness and the speed of traversing of paddle feeder 23. However the total quantity of material in any one second band 49, 50, 51 etc. will be small in comparison to the overall size of the second charge.

When the charge has been wholly transferred from hopper 14 to hopper 15, paddle feeder 30 is traversed longitudinally of hopper 15, again in a plurality of passes controlled by the limit switches 35 and 36. In this way material from hopper 15 is dislodged from shelf 16 into conveyor 31. Since second bands 49, 50, 51 etc. are very thin by comparison with first bands 43, 44, 45 and 46 the material fed to conveyor 31 is essentially a homogeneous blend of materials A, B, C and D.

Reference numeral 55 indicates a body of "dead material" in hopper 15. As with hopper 14 the limit switches 35 and 36 are set so that paddle feeder 30 does not encroach into this "dead material".

As illustrated, hoppers 14 and 15 are provided with vertical end walls 56 and 57. If desired hoppers 14 and 15 can be provided at their left-hand end with inclined end walls at an angle corresponding to the angle of repose of the materials to be blended. In this case the bodies of "dead material" 47 and 55 can be entirely eliminated.

In the drawings hoppers 14 and 15 are shown to be of equal length. However it will usually be desirable to make hopper 15 longer than hopper 14. In this way, an "overlap" of feed charge material can be built up in the hopper 15 for use in case of any interruption of operation of the illustrated blending apparatus.

The materials of stockpiles 1, 2, 3, 4 etc. may be batches of the same ore or of compatible ores and may include one or more fluxes and any other requisite materials for the smelting or other process to be effected. For example, the materials to be blended may comprise copper-containing ores, each of nominally the same type but containing differing copper contents and/or impurity levels and possibly mined at differing locations.

In other applications of the invention the materials of stockpiles 1, 2, 3, 4 etc. comprise compound fertilizer raw ingredients or cement raw materials.

As illustrated in the accompanying drawings the hoppers 14 and 15 are each provided with a slot discharge apparatus including a respective paddle feeder 23 or 30. It will however be appreciated by those skilled in the art that the invention can equally well be practised using hoppers with other forms of slot discharge apparatus having, for example, a plough or similar device in place of a paddle feeder. Such a plough or similar device can be rail-mounted like the paddle feeders 23 and 30 so as to be reciprocably traversable along the length of the hopper assembly 10. In place of the rotatable paddles 28 and 32, however, such ploughs each comprise fixed member or members each having a face appropriately inclined with respect to the shelf so that the plough acts to displace material from shelf 16 on to the appropriate conveyor 24 or 31 as the plough is traversed along the hopper assembly 10. It will be further appreciated that hopper 14 should preferably not be filled beyond the point shown in FIG. 1. Clearly if the material of band 46 is allowed to build up against end wall 58 of hopper 14 the amount of material removed from band 46 upon each pass of paddle feeder 23 may change as the hopper 14 empties. Furthermore, although the first bands 43, 44, 45 and 46 are shown for convenience as being of approximately equal thickness they can be of any desired thickness depending on the composition of the desired blend.

Although as described, best blending is achieved by maintaining a body of "dead" material 47 in hopper 14 and a similar body 55 in hopper 15, in some instances, particularly when the length of each of the hoppers 14 and 15 is considerably greater than its depth or width so that the volume of "dead" material is small in comparison to the total volume of the first or second charge, adequately good uniformity of blending can be achieved by extending each pass to extend as far as the wall 56 or 57 as the case may be so that the hopper 14 or 15 is essentially completely emptied. Similarly filling the hopper 14 or 15 beyond the position shown in the drawings may not be critical and adequate uniformity of blending can be achieved provided the empty space (e.g. that shown in FIG. 1 to the right of band 46) in the hopper is small in comparison to the overall volume of the charge.

What is claimed is:

1. A method of blending flowable solid materials which comprises establishing an elongate first charge of the materials to be blended of substantially uniform height comprising a plurality of contiguous transverse first bands, each extending from top to bottom of the first charge and each being composed of a different flowable solid material from that of the or each adjacent first band; removing material from each first band in turn in a plurality of first passes made lengthwise of the first charge, the quantity of material removed from the first charge in each first pass being small in comparison with the initial volume of the first charge; establishing an elongate second charge of substantially uniform height comprising a plurality of contiguous transverse second bands, each extending from top to bottom of the second charge and each being substantially composed of material removed from a corresponding first band;

and removing material from each second band in turn in a plurality of second passes made lengthwise of the second charge, the quantity of material removed from the second charge in each second pass being small in comparison with the initial volume of the second charge.

2. A method according to claim 1, in which the step of establishing the elongate first charge comprises supplying the materials to be blended continuously in turn to a first storage location provided with an upwardly extending first end surface at one end thereof, and building up the first charge to the desired height against the first end surface.

3. A method according to claim 2, in which the first end surface is provided by a body of "dead material".

4. A method according to claim 2, in which the step of building up the first charge comprises feeding the materials to be blended continuously in turn to a delivery point above the first storage location, sensing the height of material deposited at the first storage location in the region of the delivery point, and moving the delivery point longitudinally of the first storage location away from the one end thereof in dependence on the sensed height.

5. A method according to claim 1, in which the step of establishing the elongate second charge comprises supplying the material removed from the first charge continuously to a second storage location provided with an upwardly extending second end surface at one end thereof, and building up the second charge to the desired height against the second end surface.

6. A method according to claim 5, in which the second end surface is provided by a body of "dead material".

7. A method according to claim 5, in which the step of establishing the second charge comprises feeding the material removed from the first charge continuously to a delivery point above the second location, sensing the height of material deposited at the second storage location in the region of the delivery point, and moving the delivery point longitudinally of the second storage location away from the one end thereof in dependence on the sensed height.

8. A method according to claim 1, in which material is removed from the bottom of the first charge in each of the plurality of first passes.

9. A method according to claim 1, in which material is removed from the bottom of the second charge in each of the plurality of second passes.

10. Apparatus for blending flowable solid materials comprising means defining a first storage location; feed means for feeding the flowable solid materials continuously in turn to the first storage location so as to establish at the first storage location an elongate first charge of the materials to be blended of substantially uniform height comprising a plurality of contiguous transverse first bands, each extending from top to bottom of the first charge and each being comprised of a different flowable solid material from that of the or each adjacent first band; first extractor means longitudinally traversable with respect to the first storage location for removing material from the first charge; means for traversing the first extractor means longitudinally of the first charge in a plurality of first passes and arranged to remove material from each first band in turn in each first pass, the quantity of material removed from the first charge in each first pass being small in comparison to the initial volume of the first charge; means defining a second storage location; conveying means for conveying to the second storage location material removed from the first charge and arranged so as to establish at the second storage location an elongate second charge of substantially uniform height comprising a plurality of contiguous transverse second bands, each extending from top to bottom of the second charge and each being composed substantially of material removed from a corresponding first band; second extractor means traversable with respect to the second storage location for removing material from the second charge; and means for traversing the second extractor means longitudinally of the second charge in a plurality of second passes and arranged so as to remove material from each second band in turn during each second pass, the quantity of material removed from the second charge on each second pass being small in comparison to the initial volume of the second charge.

11. Apparatus according to claim 10, in which the first and second storage locations comprise respective first and second hoppers.

12. Apparatus according to claim 11, in which the first and second hoppers are adjacent one to another.

13. Apparatus according to claim 12, in which each hopper is of the slot discharge type having an elongate opening at its lower end arranged a predetermined height above a support surface whereby, in use, at least some of the material charged to the hopper emerges from the opening to form an elongate pile on the support surface below the opening of the hopper.

14. Apparatus according to claim 13, in which at least one of the first and second extractor means comprises a paddle feeder.

15. Apparatus according to claim 10, in which the first storage location is provided at one end thereof with an upwardly extending first end surface, and in which the feed means comprises means for continuously feeding the materials to be blended in turn to a delivery point above the first storage location, first sensor means for sensing the height of material deposited at the first storage location in the region of the delivery point, and means for moving the delivery point along the first storage location away from the first end surface in dependence on the height sensed by the first sensor means.

16. Apparatus according to claim 15, in which the first end surface is provided by a body of "dead material".

17. Apparatus according to claim 15, in which the feed means comprises an endless belt feed conveyor incorporating a tripper.

18. Apparatus according to claim 10, in which the feed means comprises an endless belt feed conveyor, a reception hopper for the flowable solid materials to be blended for supplying the endless belt feed conveyor, and a belt weigher for weighing materials carried by the endless belt feed conveyor.

19. Apparatus according to claim 10, in which the second storage location is provided at one end thereof with an upwardly extending second end surface, and in which the conveying means comprises means for continuously feeding material removed from the first charge to a delivery point above the second storage location, second sensor means for sensing the height of material deposited at the second storage location in the region of the delivery point, and means for moving the delivery point along the second storage location away from the second end surface in dependence on the height sensed by the second sensor means.

20. Apparatus according to claim 19, in which the second end surface is provided by a body of "dead material".

21. Apparatus according to claim 10, in which the feed means comprises an endless belt feed conveyor incorporating a tripper and selective discharge means for selectively discharging material from the tripper to a chosen one of the first and second storage locations, the conveying means including an endless belt transfer conveyor arranged to transfer material extracted from the first charge to the endless belt feed conveyor upstream from the tripper.

22. Apparatus according to claim 21, in which the endless belt feed conveyor is arranged to supply an intermediate hopper for feeding the endless belt feed conveyor.

23. Apparatus according to claim 21, in which the tripper is arranged to discharge into a chute device having first and second exit openings communicating with the first and second storage locations respectively, the selective discharge means comprising a flap for diverting material discharged from the tripper to a chosen one of the exit openings.

* * * * *